(12) United States Patent
McCluskey et al.

(10) Patent No.: US 6,902,837 B2
(45) Date of Patent: Jun. 7, 2005

(54) METHOD AND SYSTEM FOR BALANCED CONTROL OF BACKUP POWER

(75) Inventors: Donald McCluskey, West Hartford, CT (US); Stephen Porter, Bristol, CT (US); Michael Spaner, Deep River, CT (US)

(73) Assignee: Proton Energy Systems, Inc., Walllingford, CT (US)

( * ) Notice: Subject to any disclaimer, the term of this patent is extended or adjusted under 35 U.S.C. 154(b) by 0 days.

(21) Appl. No.: 10/065,386

(22) Filed: Oct. 11, 2002

(65) Prior Publication Data

US 2004/0053082 A1 Mar. 18, 2004

Related U.S. Application Data

(60) Provisional application No. 60/410,413, filed on Sep. 13, 2002.

(51) Int. Cl.[7] ............................ H01M 16/00; H01M 8/04
(52) U.S. Cl. ............................ 429/9; 429/23; 307/64; 320/138; 700/286
(58) Field of Search .......................... 429/9, 22, 23; 307/64; 700/286; 320/138

(56) References Cited

U.S. PATENT DOCUMENTS

| | | | |
|---|---|---|---|
| 4,100,051 A | 7/1978 | Kilby et al. ............... | 204/266 |
| 4,341,607 A | 7/1982 | Tison .......................... | 204/129 |
| 5,334,463 A | 8/1994 | Tajima et al. ................. | 429/9 |
| 5,810,284 A | 9/1998 | Hibbs et al. .................. | 244/13 |
| 5,942,811 A | 8/1999 | Stumfall et al. .............. | 307/64 |
| 5,994,793 A | 11/1999 | Bobry ......................... | 307/64 |
| 6,011,324 A | 1/2000 | Kohlstruck et al. .......... | 307/64 |
| 6,134,124 A | 10/2000 | Jungreis et al. .............. | 363/34 |
| 6,163,088 A | 12/2000 | Codina et al. ............... | 307/64 |
| 6,184,593 B1 | 2/2001 | Jungreis ...................... | 307/64 |
| 6,288,456 B1 | 9/2001 | Cratty .......................... | 307/64 |
| 6,459,231 B1 | 10/2002 | Kagatani .................... | 320/101 |
| 6,465,910 B2 | 10/2002 | Young et al. ................ | 307/64 |

(Continued)

FOREIGN PATENT DOCUMENTS

| | | | | |
|---|---|---|---|---|
| DE | 195 38 381 | * | 4/1997 | ............ H02J/9/02 |
| EP | 0755088 A2 | | 1/1997 | ............ H01M/8/18 |
| EP | 0782209 A1 | | 2/1997 | ............ H01M/8/04 |
| JP | 4-304126 | * | 10/1992 | ............ H02J/9/06 |
| JP | 410153165 A | | 6/1998 | ............ F03G/7/00 |
| JP | 02001266923 A | | 9/2001 | ............ H01M/8/00 |
| JP | 02002075388 A | | 3/2002 | ............ H01M/8/00 |
| WO | WO 01/28017 A2 | | 4/2001 | ............ H01M/8/00 |
| WO | WO 01/71885 | | 9/2001 | ............ H02J/9/00 |
| WO | WO 02/10877 A2 | | 2/2002 | ............ G05F/1/66 |
| WO | WO 02/084670 | | 10/2002 | ............ G21D/1/02 |

OTHER PUBLICATIONS

International Search Report, International Application No.: PCT/US02/32650, International Filing Date: Oct. 11, 2002, Date of Mailing: Mar. 20, 2003 (7 pages).

(Continued)

*Primary Examiner*—Stephen J. Kalafut
(74) *Attorney, Agent, or Firm*—Cantor Colburn LLP

(57) ABSTRACT

A power system comprising: a primary power source in electrical communication with a bridging power source, wherein the bridging power source is in electrical communication with a bus; a secondary power source in electrical communication with the bus, wherein the secondary power source comprises an electrochemical system including a fuel cell. The system further includes: a controller electrically disposed between and in operable communication with the bus and the bridging power source, and electrically disposed between and in communication with the bus and the secondary power source. The controller monitors the primary power source, initiates powering by the bridge power source when the primary power source exhibits selected characteristics, initiates the secondary power source when the bridging power source is depleted exceeding a first selected threshold, and initiates interruption of powering by the secondary power source.

28 Claims, 3 Drawing Sheets

U.S. PATENT DOCUMENTS

| | | | | |
|---|---|---|---|---|
| 6,555,989 | B1 | 4/2003 | Pearson | 302/101 |
| 6,611,068 | B2 * | 8/2003 | Craty | 307/64 |
| 6,628,011 | B2 * | 9/2003 | Droppo et al. | 307/64 X |
| 2002/0058175 | A1 | 5/2002 | Ruhl | 429/32 |
| 2002/0109410 | A1 | 8/2002 | Young et al. | 307/64 |
| 2002/0117899 | A1 | 8/2002 | Seefried et al. | 307/64 |
| 2002/0140293 | A1 | 10/2002 | Rothleitner et al. | 307/64 |
| 2003/0072977 | A1 | 4/2003 | Speranza et al. | 429/9 |
| 2003/0113595 | A1 * | 6/2003 | Jungrels | 429/9 X |

OTHER PUBLICATIONS

Warner, S.M., "The Operation of Aluminum–Air Reserve Power Systems," IEEE Intelec '91, Nov. 1991.

Key, T., "Fast Response, Load Matching Hybrid Fuel Cell." EPRI PEAC Quarterly Review Meeting, Washington, D.C., Jul. 27, 2001.

Warner, S.M., "Extending the Reliability of DC Power in a Telecommunications Network", INTELEC '93 15 International Telecommunications Engergy Conference, Paris, 1993 (Month Unknown).

Maloney, T., "PEM–Battery: Design, Construction, and Test, "Power Computing Solutions, Inc., NETL Publications, 1999 Conference Proceedings (Month Unknown).

Ertl, H. et al., "A Novel Multi–Cell DC–AC Converter for Applications in Renewable Energy Systems, "Proceedings of the 43rd International Power Electronics Conference, Jun. 2001.

Passive Component Industry, "Large–Can EDLC Capacitors: A Market in the Making", Jul./Aug. 2001.

Nickerson, J., "Ultracapacitors: Managing Power and Energy", Darnell Group, Inc. 2000 (Month Unknown).

Kato, N. et al., "A 1 kw Portable Fuel Cell System Based on Polymer Electrolyte Fuel Cells, "NTT R and D, vol. 48, No. 12, pp. 877–881, 1991 (Month Unknown).

E.M. Cortright, chairman, "Report of Apollo 13 Review Board, "NASA, Appendix A, pp. A–42 to A–51, Jun. 15, 1970.

Letter from Robert C. Laurenson of Hawrey, Simon, Arnold & White dated Sep. 4, 2003 including Claim Chart of U.S. Patent Application Publication No. 2003/0072977 A1 (7 pages).

* cited by examiner

METHOD AND SYSTEM FOR BALANCED CONTROL OF BACKUP POWER

CROSS REFERENCE TO RELATED APPLICATIONS

This application claims the benefit of U.S. Provisional Application No. 60/410,413, filed Sep. 13, 2002 the contents of which are incorporated by reference herein in their entirety.

BACKGROUND OF INVENTION

This disclosure relates generally to electrochemical cell systems, and especially relates to the storage and recovery of energy from a renewable power source and electrochemical cell.

Geographically remote areas such as islands or mountainous regions are often not connected to main utility electrical grids due to the cost of installing and maintaining the necessary transmission lines to carry the electricity. Even in remote communities where the transmission lines are in place, it is not uncommon for frequent and extended power outages due to weather related faults. In either case, to prevent economic loss in times of an electrical outage, it is often necessary for these communities or industries in these regions to create local "micro" electrical grids to ensure a reliable and uninterruptible power system. This uninterruptible power system may be either a primary system where there is no connection to the main utility grid, or a backup system that activates when an outage occurs.

Electrical power for the local grids comes from a variety of sources including hydrocarbon based and renewable power sources. Within a particular grid it is not uncommon to have multiple generation sources, such as diesel generators, natural gas generators, photovoltaic arrays, and wind turbines working in combination to meet the needs of the grid.

Electrical demands placed on the local grid will vary during the course of a day, week, or season. Since it is not often practical or possible to turn generation sources on and off, inevitably excess energy will be created. This excess energy is typically converted into another form of energy such as heat for storage in another medium such as water. In cold climates, the heated water can then be used for other purposes such as heating buildings, cooking or maintaining temperature in equipment. As the load requirements of the grid increase, it is difficult or impossible to recapture the converted energy back into electrical energy for use in the electrical grid. Further complicating matters is that renewable power sources do not typically run continuously at full power and will experience extended periods of low to no energy output (e.g. night time or seasonal low wind periods).

Electrochemical cells are energy conversion devices, usually classified as either electrolysis cells or fuel cells commonly employed to address back-up power requirement when a grid fails or when a renewable energy source is unavailable. An electrolysis cell typically generates hydrogen by the electrolytic decomposition of water to produce hydrogen and oxygen gases, whereas in a fuel cell hydrogen typically reacts with oxygen to generate electricity. In a typical fuel cell, hydrogen gas and reactant water are introduced to a hydrogen electrode (anode), while oxygen gas is introduced to an oxygen electrode (cathode). The hydrogen gas for fuel cell operation can originate from a pure hydrogen source, methanol or other hydrogen source. Hydrogen gas electrochemically reacts at the anode to produce hydrogen ions (protons) and electrons, wherein the electrons flow from the anode through an electrically connected external load, and the protons migrate through a membrane to the cathode. At the cathode, the protons and electrons react with the oxygen gas to form resultant water, which additionally includes any reactant water dragged through the membrane to cathode. The electrical potential across the anode and the cathode can be exploited to power an external load.

This same configuration is conventionally employed for electrolysis cells. In a typical anode feed water electrolysis cell, process water is fed into a cell on the side of the oxygen electrode (in an electrolytic cell, the anode) to form oxygen gas, electrons, and protons. The electrolytic reaction is facilitated by the positive terminal of a power source electrically connected to the anode and the negative terminal of the power source connected to a hydrogen electrode (in an electrolytic cell, the cathode). The oxygen gas and a portion of the process water exit the cell, while protons and water migrate across the proton exchange membrane to the cathode where hydrogen gas is formed. The hydrogen gas generated may then be stored for later use by an electrochemical cell.

In certain arrangements, the electrochemical cells can be employed to both convert electricity into hydrogen, and hydrogen back into electricity as needed. Such systems are commonly referred to as regenerative fuel cell systems. Regenerative fuel cells may be used in power generation systems as either primary or secondary power sources. However, because regenerative fuel cell systems generally take a certain amount of time from the point of initial activation to delivering full power, there may be a brief delay of power attendant thereto when switching over from a primary power supply to backup power generated by a fuel cell supply. What is needed in the art is a cost effective apparatus and method for bridging short duration power interruptions.

SUMMARY OF INVENTION

Disclosed herein is a power system, comprising: a primary power source in electrical communication with a bridging power source, wherein the bridging power source is in electrical communication with a bus; a secondary power source in electrical communication with the bus, wherein the secondary power source comprises an electrochemical system including a fuel cell. The system further includes: a controller electrically disposed between and in operable communication with the bus and the bridging power source, and electrically disposed between and in communication with the bus and the secondary power source. The controller monitors the primary power source, initiates powering by the bridge power source when the primary power source exhibits selected characteristics, initiates the secondary power source when the bridging power source is depleted exceeding a first selected threshold, and initiates interruption of powering by the secondary power source when at least one of the primary power source does not exhibit the selected characteristics and the secondary power source is depleted.

Also disclosed herein is a method for operating a power system comprising: monitoring a primary power source; if the primary power source exhibits selected characteristics: directing power from a bridging power source to a bus; and if the bridging power source is depleted to a first selected threshold, initiating a secondary power source and powering the bus with the secondary power source until at least of the primary power source does not exhibit the first selected characteristics and the secondary power source exhibits second selected characteristics. The secondary power source comprises a fuel cell.

Also disclosed is a method for operating a power system, comprising: monitoring a primary power source; if the primary power source is insufficient to meet a demand for power: powering a bus with a bridging power source and if the bridging power source is depleted to a first selected threshold, initiating a secondary power source and powering with the secondary power source until at least one of the primary power source is sufficient to meet said demand and the secondary power source exhibits second selected characteristics. The secondary power source comprises a fuel cell, and the first selected threshold is that said bridge power source comprises sufficient power to power the bus while the secondary power source initiates.

Further, disclosed herein is a storage medium encoded with a machine-readable computer program code, said code including instructions for causing a computer to implement the abovementioned method for operating a power system.

Further, disclosed herein is a computer data signal, said computer data signal comprising: instructions for causing a computer to implement the above-mentioned method for operating a power system.

The above discussed and other features will be appreciated and understood by those skilled in the art from the following detailed description and drawings.

BRIEF DESCRIPTION OF DRAWINGS

Referring now to the drawings, which are meant to be exemplary and not limiting, and wherein like elements are numbered alike.

DETAILED DESCRIPTION

The following description will provide specific examples with respect to the load and power source voltages for example only. It will also be understood that the method and apparatus for bridging short duration power interruptions may be used with different types of primary/secondary sources and/or other operating voltages, and is not limited to the implementations described herein. Various power sources range from grid power to solar power, hydroelectric power, tidal power, wind power, fuel cell power, and the like, as well as combinations comprising at least one of the foregoing power sources (e.g., via solar panel(s), wind mill(s), dams with turbines, electrochemical cell systems, and the like). It should further be noted that although the disclosed embodiments are described by way of reference to power system with employing a fuel cell as back up power and a capacitor as a bridging power source, it will be appreciated that such references are illustrative only and the disclosed embodiments may be applied to any instance where back up power and/or bridging power sources are desired. Moreover, the references and descriptions herein may apply to many forms of power systems and sources as described above.

Figure 1:
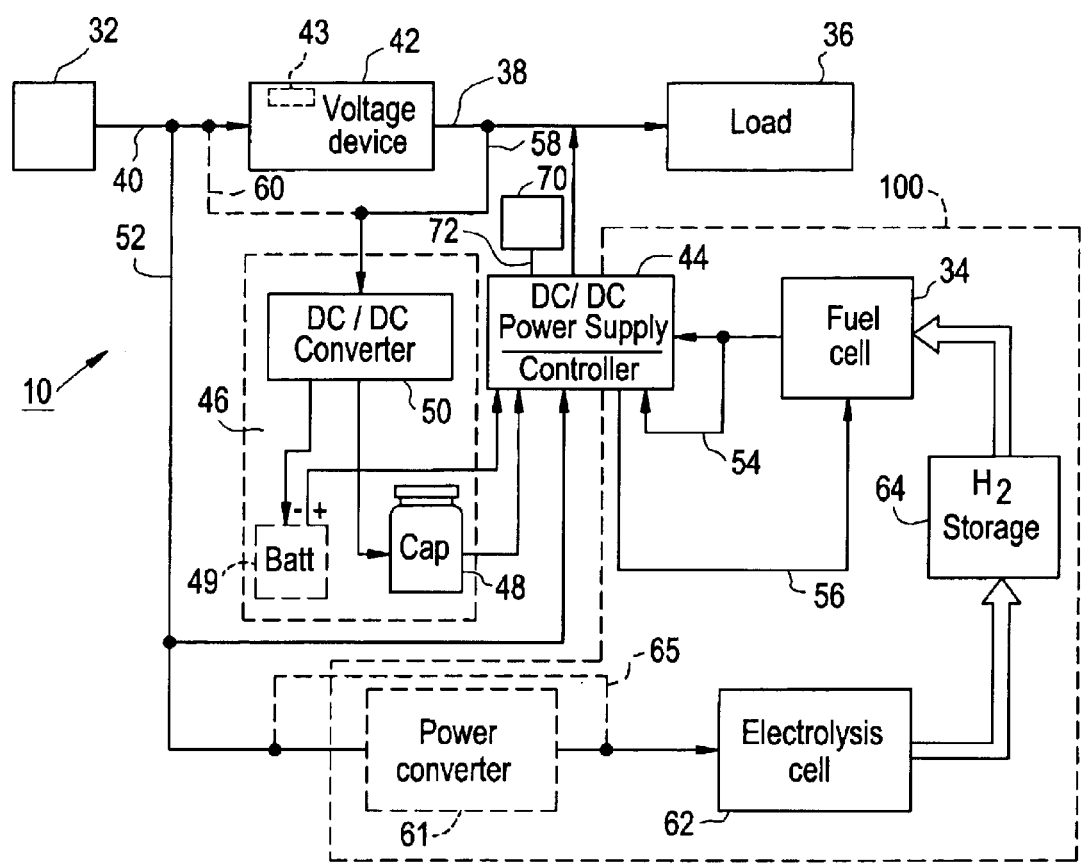
FIG. 1 is a block diagram of a power system including a secondary power system and a power bridging apparatus.

FIG. 1 depicts a block diagram of a portion of power system 10 having a primary power source 32 such as generated grid power or that from a renewable source, a secondary power source 100 and a load 36, which load 36 is fed from a feeder bus 38. In the example shown, the primary power source 32 provides power along a primary bus 40; e.g., 120/240 volts alternating current (VAC). It will be appreciated that the actual primary supply voltage is based upon the type of power source including, but not limited to other alternating current (AC) voltage sources, direct current (DC) sources renewable sources such as wind, solar and the like.

Optionally, a conversion device 42 can be employed to rectify the power type (e.g., alternating current (AC) to direct current (DC), or DC to AC), or to transform the power level (e.g., 48 volts direct current (VDC) to 24 VDC). For example, rectifier 43 can convert 120/240 VAC supply voltage fed from the primary power supply 32 to a 24 VDC supply, fed through feeder bus 38 to load 36.

A secondary power source 100 may comprise an electrochemical cell system. The electrochemical cell system may include a fuel cell 34, or a regenerative fuel cell system comprising a fuel cell 34, electrolysis cell 62, an optional power converter 61, optional associated hardware, optional storage devices 64, controls, and the like. The size, i.e., the number of cells, of the fuel cell 34 and optional electrolysis cell 62, and the desired hydrogen production of the electrolysis cell 62 is dependent upon the desired power output of the secondary power source 100 including fuel cell 34. For example, a secondary power source 100 can include a fuel cell 34 that provides about 50 to about 100 VDC output voltage for use by the load 36.

In order to provide backup power for the load 36, a controller/DC-DC power supply 44 is used to convert the power from the secondary power source 100 to a power receivable by the feeder bus 38. For example, the input from the fuel cell 34 is converted to an output that is connected to feeder bus 38, wherein a smooth output is an uninterrupted power that has an average voltage fluctuation of less than about 10% over several seconds. An uninterrupted power is a less than about 0.005 second delay between cease of power supply from primary power source 32 and introduction of power from controller/DC-DC power supply 44.

In order to perform the prescribed functions and desired processing, as well as the computations therefore (e.g., the control algorithms for balanced back up power application (s), and the like), controller/DC-DC power supply 44 may include, but not be limited to, a processor(s), computer(s), memory, storage, register(s), timing, interrupt(s), communication interface(s), and input/output signal interfaces, and the like, as well as combinations comprising at least one of the foregoing. For example, controller/DC-DC power supply 44 may include input signal processing and filtering to enable accurate sampling and conversion or acquisitions of such signals from communications interfaces. Additional features of controller/DC-DC power supply 44 and certain processes, functions, and operations therein are thoroughly discussed at a later point herein.

During operation with a regenerative fuel cell system, the primary power source 32 provides power via optional power converter 61 to an electrolysis cell 62 e.g., an electrolyzer, which generates hydrogen gas. When the optional power converter 61 is not employed, the electrolysis cell 62 may be directly connected to the primary bus 40 via line 65. The hydrogen generated by the electrolysis cell 62 is stored in an appropriate storage device 64 for later use. At such a point in time as required for operation such as outages of the primary power source 32 and the like, or for a renewable power source, during the day or season where the power generation capability of the renewable power source declines (e.g., night time), the primary power source 32 or secondary power source 100 will need to offset the loss in capacity. The hydrogen previously stored in storage device 64 is supplied to a hydrogen electrochemical device, e.g., fuel cell 34, which converts the hydrogen into electricity to supply to the load 36. Power generation will continue until the hydrogen in the storage device 64 is exhausted or the power is no longer required. Reasons for ending power generation may include, for example, the restoration of the grid power, restoration of renewable energy sources (such as solar, wind, wave power, or the like), and/or the determination that peak-shaving is no longer cost effective or no longer required.

Once the amount of hydrogen in the hydrogen storage device 64 decreases below a pre-determined level, the electrolysis cell 62 engages to replenish the hydrogen supply. Preferably, hydrogen will be replenished whenever the hydrogen storage level in the hydrogen storage device 64 is less than full, and there is power available from the primary power source 32 for the electrolysis operation to ensure the longest possible operational duration capability for the secondary power source 100, e.g., the fuel cell 34. Alternatively, hydrogen may be replenished with the addition of hydrogen from another source. For example, another hydrogen generating means, or replacement, replenishment, or supplementation of the existing hydrogen storage device 64.

Returning to FIG. 1 once again for discussion of the secondary power source 100, because fuel cell systems generally take a certain amount of time from the point of initial activation to delivering full power, there may be a brief delay of power attendant thereto when switching over a primary power source 32 to secondary power source 100 and power generated by a fuel cell 34. To address this time lapse, a power system may employ a bridging power source 46. The bridging power source 46 stores electrical energy and temporarily provides power to load 36 in the event of any gap or delay between the transfer of power delivery from the primary power source 32 to the power delivery from the secondary power source 100, namely, fuel cell 34. For example, power system 10 may include a monitor of the primary power source 32 (e.g., a grid, solar power, another electrochemical system, and the like); and upon a cease in power from the primary power source 32, start-up a secondary power system 100 and introduce power from the bridging power source 46 during the time lapse. The bridging power source 46 may comprise a capacitor 48 and/or battery 49 and optionally a power converter 50.

Charging of the capacitor 48 and/or battery 49 may be accomplished in various fashions, depending upon the type of primary power source 32 and the voltage of feeder bus 38 or primary bus 40, accordingly. The capacitor 48 or battery 49 can be charged with power from primary bus 40 via optional power converter 50. Power converter 50 converts the voltage from the bus voltage on feeder bus 38 (or primary 40 depending upon the implementation) to the capacitor/battery voltage. Meanwhile, a conversion device 42 can be employed, if desired, to adjust the voltage of primary bus 40 to the desired voltage for the feeder bus 38. Alternatively, the power can pass from primary bus 40 through conversion device 42, to feeder bus 38. Power converter 50 may alternatively convert voltages from feeder bus 38 to charge to the capacitor and/or battery 49. Finally, it will be appreciated, that capacitor 48 and/or battery 49 may be operably connected to either primary bus 40 or feeder bus 38 directly. In this embodiment, power from primary bus 40 can be converted from AC to DC, and/or the DC voltage of the feeder bus 38 may be converted to the desired capacitor voltage via power converter 50. For example, the energy used to charge capacitor 48 or battery 49 can come from the output of rectifier 43 that converts 120 (or 240) VAC on primary bus 40 to 24 VDC on feeder bus 38. The power converter 50 then converts the low voltage (e.g., 24 VDC) input into an appropriate voltage output, which is then used to charge capacitor 48 and/or battery 49.

The output of capacitor 48 and/or battery 49 is connected to controller/DC-DC power supply 44. When capacitor 48 and/or battery 49 is used to bridge the gap in power between a switch-over from primary power source 32 to the secondary power source 100, the controller/DC-DC power supply 44 may be employed to convert the power from the power level of the capacitor 48 to the power level of the feeder bus 38. Preferably, power is supplied by capacitor 48 and/or battery 49 for the period of time from a cease in the power supply from primary power source 32 until commencement of power supply from fuel cell 34 (i.e., when the fuel system attains operating conditions and begins to supply a predetermined amount of power).

In order to determine when, and for what period, to draw power from capacitor 48, sensing lines 52 and 54 are connected from the primary bus 40 and the output of the secondary power source 100 to the controller/DC-DC power supply 44. In this manner, controller/DC-DC power supply 44 can monitor the status of the primary power source 32 and the secondary power source 100 so that the switching to an appropriate power source may be determined and controlled. It will easily be appreciated that in controller/DC-DC power supply 44, the DC-DC power supply may optionally be separated from the controller.

During a normal mode of operation, the power supplied from primary power source 32 (e.g., 120/240 VAC or optionally a DC source) on primary bus 40 is converted (in the depicted configuration) to a DC voltage by rectifier 43 of conversion device 42. The load 36 draws current from feeder bus 38, regardless of the source of the power thereto. During the normal mode, bridging power source 46 maintains stored electrical energy in the event of a temporary power interruption.

In the event of a loss of power from the primary power source 32, controller/DC-DC power supply 44 senses the loss on the primary bus 40 through sensing line 52. A signal is then sent by controller/DC-DC power supply 44 to the secondary power source 100 (through line 56) to begin generating backup power for feeder bus 38. Because of the inherent time delay of a fuel cell 34 in producing full power, controller/DC-DC power supply 44 converts the output voltage of capacitor 48 and/or battery 49 to voltage that is directed to feeder bus 38 until the secondary power source 100, and more specifically the fuel cell 34 is ready to take over so that load 36 sees an uninterrupted supply of power.

Once controller/DC-DC power supply 44 senses that the fuel cell 34 is generating a desired amount of power, the capacitor 48 and/or battery 49 may be disconnected (circuit broken) from feeder bus 38 and backup power is now directed from the secondary power source 100 and more specifically the fuel cell 34, through controller/DC-DC power supply 44, and onto feeder bus 38. Optionally, at the same time, capacitor 48 and/or battery 49 may be recharged through line 58 from feeder bus 38 and power converter 50. The connecting and disconnecting of the capacitor 48 and/or battery 49 to the DC-DC converter within controller/DC-DC power supply 44 may be accomplished with one or more device(s) such as a power field effect transistor(s) (FET; not shown), transistor(s), thyrister(s), relay(s), switching device (s), and the like, as well as combinations including at least one of the foregoing. Optionally, controller/DC-DC power supply 44 may leave capacitor 48 and/or battery 49 in the circuit but draw essentially no power therefrom. If power from the primary power source 32 is subsequently restored, this will be sensed by controller/DC-DC power supply 44. This time, however, there is no need to discharge capacitor 48 and/or battery 49, since controller/DC-DC power supply 44 may seamlessly switch from the secondary power source 100 and fuel cell 34 back to primary power source 32 by deactivating the fuel cell 34.

Either during operation of the secondary power source 100 (via feeder bus 38) and/or after reconnection to primary power source 32 (via primary bus 40), the bridging power source 46, namely the capacitor 48 and/or battery 49 may be charged (or recharged, as is appropriate). During charging, current supplied from feeder bus 38 is sent to power converter 50, which converts the voltage of feeder bus 38 to that appropriate to charge capacitor 48 and/or battery 49. It should be noted, that once capacitor 48 and/or battery 49 is/are charged, no significant current would be drawn by power converter 50 (if used) from feeder bus 38. Alternatively, it will be further appreciated that in an implementation where primary power source 32 and primary bus 40 comprise a VDC power source, power may be optionally be drawn directly from the primary bus 40 (or optionally through the power converter 50) to charge the capacitor 48 and/or battery 49.

Moreover, the power converter 50 may, be configured as an AC/DC converter (rectifier) coupled directly to the primary power source 32 and primary bus 40. In addition, for yet another alternative embodiment, the output voltage of controller/DC-DC power supply 44 may be generated at a slightly lower value than that resultant from the conversion device 42 (e.g., by about 1 to about 3 volts). In so doing, any current flow from controller/DC-DC power supply 44 onto feeder bus 38 would be limited until such time as the primary power source 32 is unavailable.

Employing a system comprising an electrochemical system in conjunction with a high voltage, medium-sized capacitor as part of a power bridging power source, a cost-effective uninterrupted power supply system is realized. This is especially the case when one or more of the sources have an inherent power-up time associated therewith, such as secondary power source 100 including a fuel cell 34. It should also be noted that the number of components employed may be reduced as disclosed by employing commonality in selected components, e.g., using a common DC-DC power supply 44 connected to both the capacitor 48 and/or battery 49 and the fuel cell 34 instead of multiple power supplies.

In yet another alternative embodiment in the event of a loss of power from the primary power source 32, and when the fuel cell 34 is not providing power either because of a fault or because the hydrogen storage device(s) 64 are depleted, the power system 10 may draw power from the bridging apparatus 46 as described earlier. In this instance, the controller/DC-DC power supply 44 converts the output voltage of capacitor 48 and/or battery 49 to voltage that is directed to feeder bus 38 and/or more particularly selected loads to at least facilitate control and diagnostics. Under this conditions, as the stored energy in the capacitor 48 and/or battery 49 is depleted, and therefore the voltage drops, additional current may be drawn by the controller/DC-DC power supply 44 to supply a specified load. Ultimately, as additional energy from the capacitor 48 and/or battery 49 is expended, the voltage continues to drop and the current will rise, potentially to unacceptable levels. Therefore, in an exemplary embodiment, the charge status of the capacitor 48 and/or battery 49 of the bridging power source 46 may be monitored. The controller/DC-DC power supply 44 monitors the capacitor 48 and/or battery 49 voltage and/or current and the capacitor 48 and/or battery 49 may be disconnected (open circuit) from to avoid the controller/DC-DC power supply 44 drawing unacceptably high current levels therefrom. Preferably, the monitoring of the energy stored in the capacitor 48 and/or battery 49 and the connection and disconnection thereof will include hysteresis to avoid nuisance connections and reconnections. For example, hysteresis may be employed to ensure that the controller/DC-DC power supply 44 does not reconnect to the capacitor 48 and/or battery 49 following a disconnection based upon the voltage rise that may follow a disconnection. Once again, the connecting and disconnecting of the capacitor 48 and/or battery 49 to the DC-DC converter within controller/DC-DC power supply 44 may be accomplished with a device such as a power field effect transistor (FET; not shown), or the like.

In yet another embodiment of power system 10 in the event of a loss of power from the primary source 32, and either prior to the fuel cell 34 being available or when the fuel cell 34 is not providing power either because of a fault or because the hydrogen storage device(s) are depleted, the power system may draw power from the bridging power source 46 as described earlier. In this embodiment, evaluations of the status of the power system 10 are employed to facilitate establishing a balanced utilization of the available power sources e.g., primary power source 32, secondary power source 100, and bridging power source 46 in the power system 10. For example, for situations involving short duration and/or multiple interruptions less than a selected threshold of the primary power source 32, it may be advantageous to operate and provide power to the feeder bus 38 from the bridging power source 46 alone, without initiating the secondary power source 100. This may even be beneficial despite the secondary power source 100 and more specifically the fuel cell 34 having fuel and being available to provide power. Such a configuration avoids nuisance initiations of the fuel cell 34 and thereby provides reduced fuel depletion and enhanced life for the fuel cell 34. In an exemplary embodiment a four second power interruption of the primary power source 32 is covered by the bridging power source 46 without initiating the fuel cell 34. Should the interruption of the primary power source 32 exceed the selected threshold e.g., four seconds, the secondary power source 100, e.g., the fuel cell 34 is initiated to supply power to the load 36 and optionally to recharge the bridging power source 46. Preferably, the connection and disconnection of the bridging power source 46, e.g., the capacitor 48 and/or battery 49 as well as the initiation of the fuel cell 34 includes hysteresis to avoid nuisance initiations, connections, and reconnections. For example, hysteresis may be employed to ensure that the fuel cell 34 is not, unnecessarily initiated and then shut down. It will be appreciated that with such a configuration, a control system may be implemented, which ensures balance operation utilizing the energy available from the bridging apparatus 46 without unnecessarily expending energy to initiate the fuel cell 34. Once again, the connecting and disconnecting of the capacitor 48 and/or battery 49 to the DC-DC converter within controller/DC-DC power supply 44 may be accomplished a device such as a power field effect transistor (FET; not shown), or the like.

Figure 2:
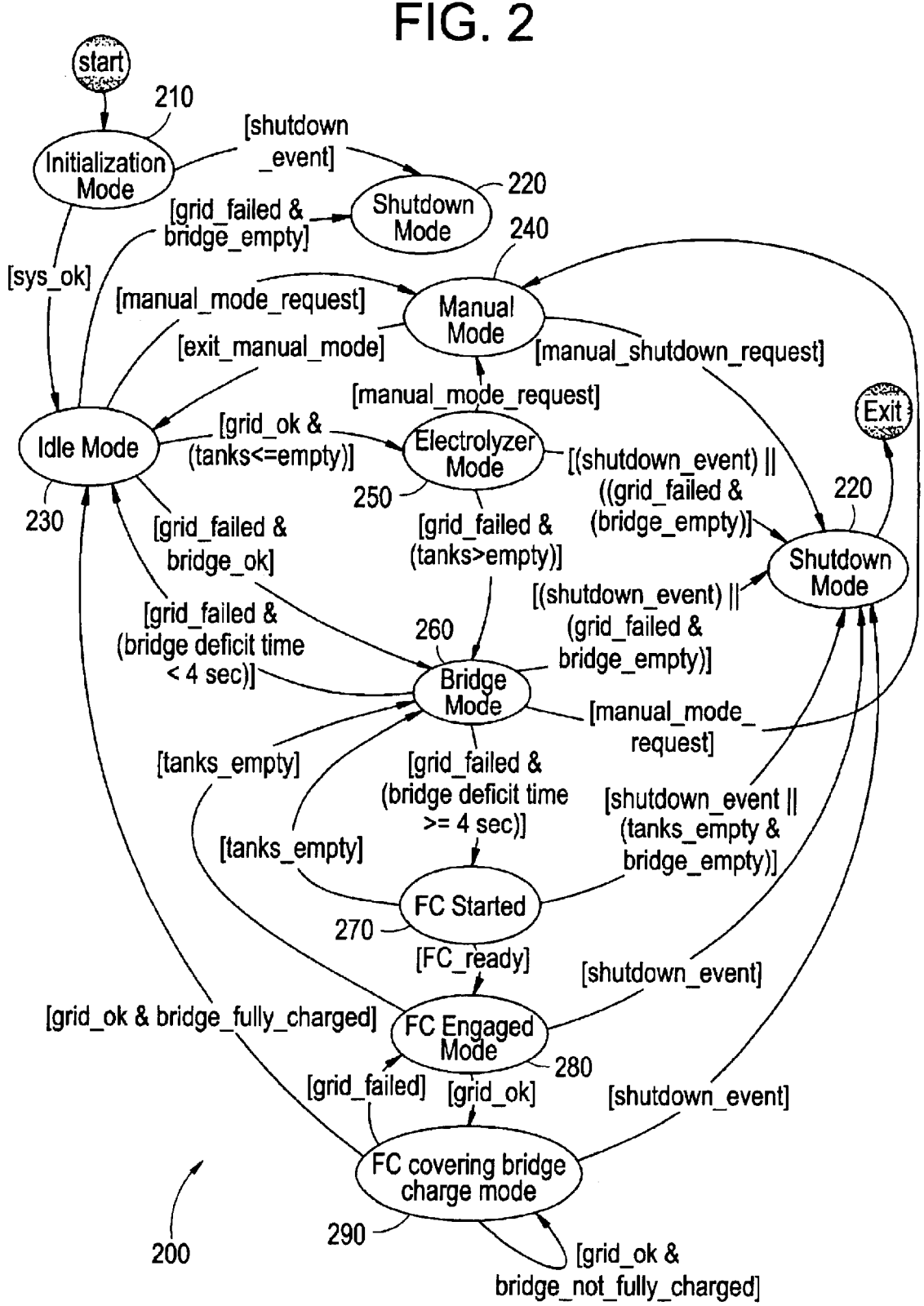
FIG. 2 is a state transition diagram depicting an exemplary embodiment for a control methodology of a power system.

Continuing with FIG. 1 and turning now to FIG. 2, a state transition diagram depicting an exemplary method of control process 200 for the power system 10 is provided. The process 200 includes numerous modes and the criterion, requirements, events and the like to control changes of state among the various modes. The process 200 initiates with an initialization mode 210 monitoring and evaluation of various sensors ant states to ascertain the status of the power system 10. Such monitoring may include evaluation of the voltage of the primary power source 32 on the primary bus 40, e.g., grid power a renewable source, such as wind speed or light level. As disclosed earlier, such a renewable power source includes solar wind, tidal, geothermal resources, and the like, as well as combinations including at least one of the foregoing. Should it be determined that a fault exists, which may be characterized as a shut down event, the process 200 transfers modes to a shut down mode 220 exiting the process 200. Should it be determined that the power system 10 status check is satisfactory (no fault exists, which may be characterized as a shut down event) the process 200 changes modes to an idle mode 230.

In the idle mode 230, processing is completed to determine the status of selected elements of the power system 10 and query the occurrence of selected commands for mode selection and power system 10 operation. First, from the idle mode 230, if a manual mode is requested, for example by an external request, e.g. operator, the process 200 changes modes to a manual mode 240. Conversely, should selected criteria be satisfied for exiting the manual mode, the process 200 reverts to the idle mode 230. Selected criteria for exiting the manual mode in this instance may include but not be limited to an operator request. Continuing with the idle mode 230, should the primary power source 32 exhibit satisfactory status, and the hydrogen storage device 64 is empty or lower than a selected level, the process 200 changes state to an electrolyzer mode 250. In an exemplary embodiment, the evaluation of the status of the hydrogen storage device 64 may include monitoring the pressure of the hydrogen stored in the hydrogen storage device 64. By monitoring the pressure, of the known storage volume the duration of back up time available from operating the fuel cell 34 of the secondary power source 100 may be deduced. In an exemplary embodiment a hydrogen storage device of a volume of about 200 cubic feet at standard pressure less than or equal to about 200 pounds per square inch (psi) indicates that the hydrogen storage device 64 is considered empty. Should the primary power source 32 exhibit unsatisfactory status and the bridging power source 46 exhibits a satisfactory status, the process 200 changes state to a bridge mode 260. Conversely, should the primary power source 32 exhibit satisfactory status, and the bridging power source 46 can provide less than a selected amount of power, the process 200 reverts from the mode 260 back to the idle mode 230. In an exemplary embodiment, when the primary power source 32 is satisfactory and the bridging power source 46 can provide less than about four seconds of power, the process 200 reverts from the bridge mode 260 back to the idle mode 230. The status of the bridging power source 46 may be ascertained by monitoring the current and/or voltage. For example, for a bridging power source 46 including a capacitor 48, the status of the power available from the capacitor may readily be determined by well-known means once either the current or the voltage is known. Finally, should the primary power source 32 exhibit unsatisfactory status and the bridging power source 46 also exhibits an unsatisfactory status e.g., has insufficient energy to operate in the bridge mode 260, the process 200 changes state from the idle mode 230 to the shutdown mode 220.

Turning now to the manual mode 240, consideration may now be given to the criteria for transition thereto and therefrom. As stated earlier, the manual mode 240 may be entered from the idle mode 230, if a manual mode is requested. Conversely, should selected criteria be satisfied, the process 200 transitions from the manual mode 240 to the idle mode 230. Continuing with discussion of the manual mode 240 and similar to the idle mode 230, the manual mode 240 may also be entered from the electrolyzer idle mode 250 and/or the bridge mode 260, if a manual mode is requested. Finally, upon satisfaction of selected criteria for a manual shutdown, the process 200 changes state to the shut down mode 220.

Continuing with FIG. 2 and the electrolyzer mode 250, the electrolyzer mode 250 may only be entered as described earlier from the idle mode 230 when the primary power source 32 exhibits satisfactory status, and the hydrogen storage device 64 is empty or lower than a selected level. As stated above, the process 200 transitions from the electrolyzer mode 250 to the manual mode 240 upon a manual mode request. The process also transition from the electrolyzer mode 250 to the bridge mode 260 if primary power source 32 exhibits satisfactory status, and the hydrogen storage device 64 is not empty, nor lower than a selected level. Finally, exiting the electrolyzer mode 250 may be achieved by a transition of the process 200 to the shutdown mode 220 upon the occurrence of a fault exists, which may be characterized as a shut down event and the primary power source 32 exhibits unsatisfactory status, and the bridging power source 46 has insufficient energy.

Turning now to the bridge mode 260, the bridge mode 260 may be entered from the electrolyzer mode 250 if primary power source 32 exhibits unsatisfactory status, and the hydrogen storage device 64 is not empty, nor lower than a selected level. Additionally, as disclosed earlier, the process 200 transitions from the idle mode 230 to the bridge mode 260 should the primary power source 32 exhibit unsatisfactory status and the bridging power source 46 exhibits a satisfactory status. Conversely, should the primary power source 32 exhibit satisfactory status, and the bridging power source 46 can provide less that a selected amount of energy, the process 200 transfers from the bridge mode 260 to the idle mode 230. In an exemplary embodiment, when the primary power source 32 is satisfactory and the bridging power source 46 can provide less than about four seconds of power, the process 200 transitions from the bridge mode 260 to the idle mode 230.

Continuing with the bridge mode 260, the bridge mode 260 may also be entered from either the FC started mode 270 or the FC engaged mode 280 if it is determined that the hydrogen storage device(s) 64 are empty (or below a selected level). Similar to the idle mode 230 and electrolyzer mode 250 discussed earlier, a manual mode request results in a transition of the process 200 from the bridge mode 260 to the manual mode 240. Additionally, exiting the bridge mode 260 may be achieved by a transition of the process 200 to the FC started mode 270 if the primary power source 32 exhibits unsatisfactory status for more than a selected amount of time, and the bridging power source 46 exhibits sufficient power. In an exemplary embodiment, the selected amount of time is a range based upon the selected components of the system. For example, to start the fuel cell 34. In an exemplary embodiment a range from one to 30 seconds is likely, with greater than or equal to about 4 seconds preferred. Finally, exiting the bridge mode 260 may be achieved by a transition of the process 200 to the shutdown mode 220 upon the occurrence of a fault exists, which may be characterized as a shut down event and the primary power source 32 exhibits unsatisfactory status, and the bridging power source 46 has insufficient energy.

Continuing with FIG. 2 and moving now to the FC started mode 270, it will be evident from the figure and as discussed earlier, that the FC started mode 270 may be entered via the bridge mode 260 if the primary power source 32 exhibits unsatisfactory status for more than a selected amount of time. Once again, in an exemplary embodiment, the time is greater than or equal to about 4 second of load capability. The process 200 transitions from the FC started mode 270 to a FC engaged mode 280 if status indicates that the fuel cell 34 is ready. In an exemplary embodiment, a fuel cell ready indication is provided if the fuel cell 34 is at operating temperature, pressure and the like and prepared to generate power upon the application of a load. Continuing with the FC started mode 270, another transition out of the mode is if the hydrogen storage device(s)s 64 is empty or below a selected threshold. In this instance, the process 200 transitions to the bridge mode 260 as discussed earlier. Finally, exiting the FC started mode 270 may be achieved by a transition of the process 200 to the shutdown mode 220 upon the occurrence of a fault exists, which may be characterized as a shut down event and the hydrogen storage device(s) 64 is empty or below a selected threshold, and the bridging power source 46 has insufficient energy.

Turning to the FC engage mode 280, once again it should be evident that the process 200 transitions to the FC engaged mode 280 from the FC started mode 270 if status indicates that the fuel cell 34 is ready. Additionally, as with the FC started mode 270, a transition out of the FC engaged mode 280 is if the hydrogen storage device(s) 64 is empty or below a selected threshold. In this instance, the process 200 transitions to the bridge mode 260. From the FC engaged mode 280, if primary power source 32 changes status, i.e., exhibits satisfactory status e.g. grid power becomes available, then the FC engaged mode 280 transitions to the FC covering bridge mode 290. Conversely, if the process 200 is operating from the FC covering bridge mode 290 and the primary power source 32 changes status, i.e., exhibits unsatisfactory status e.g. grid power becomes unavailable then the process 200 transitions back to the FC engaged mode 280. Unsatisfactory status may include but not be limited to a power source being unavailable inoperable, inadequate to provide power at expected parameters, out of tolerance, and even unfueled and the like. Finally, exiting the FC engaged mode 280 may be achieved by a transition of the process 200 to the shutdown mode 220 upon the occurrence of a fault exists, which may be characterized as a shut down event.

Continuing once again with FIG. 2 and turning now to the FC covering bridge mode 290. The FC covering bridge mode keeps the fuel cell 34 operating to ensure that the bridging power source 46 (FIG. 1) is charged and prepared to address the next power interruption of the primary power source 32. It will be appreciated that an advantage of the FC covering bridge mode is that it prevents a series of power interruptions from depleting the bridging power source 46. As discussed for the FC engaged mode, if primary power source 32 changes status, e.g., exhibits unsatisfactory status e.g. grid power becomes unavailable, then the process 200 transitions from the FC covering bridge mode 290 to the FC engaged mode 280. Conversely, as stated above, if the process 200 is operating from the FC engaged mode 280 and the primary power source 32 changes status, i.e., exhibits satisfactory status e.g. grid power becomes available then the process 200 transitions back to the FC covering bridge mode 290. Additionally, from the FC covering bridge mode 290, the process 200 will transition from the FC covering bridge mode 290 to the idle mode 230 if the primary power source 32 exhibits satisfactory status, e.g., grid power is available and in tolerance, and the bridging power source 46 has been charged to a sufficient threshold. In an exemplary embodiment, the bridging power source 46 has been charged to a sufficient threshold if it is substantially fully charged. The FC covering mode 290 also includes a status check and transition to its self in the event the primary power source 32 exhibits satisfactory status, e.g., grid power is available and in tolerance, and the bridging power source 46 has not yet been charged to a sufficient threshold. In an exemplary embodiment, the bridging power source 46 has been charged to a sufficient threshold if it is substantially fully charged. Finally, exiting the FC covering bridge mode 290 may be achieved by a transition of the process 200 to the shutdown mode 220 upon the occurrence of a fault exists, which may be characterized as a shut down event.

Finally, for consideration of the shut down mode 220, it will be appreciated, that the state transitions of the process 200 to the shut down mode 220 have each been addressed in explanation of the other modes above. Therefore, additional discussion would be redundant and is avoided for simplicity.

Figure 3:
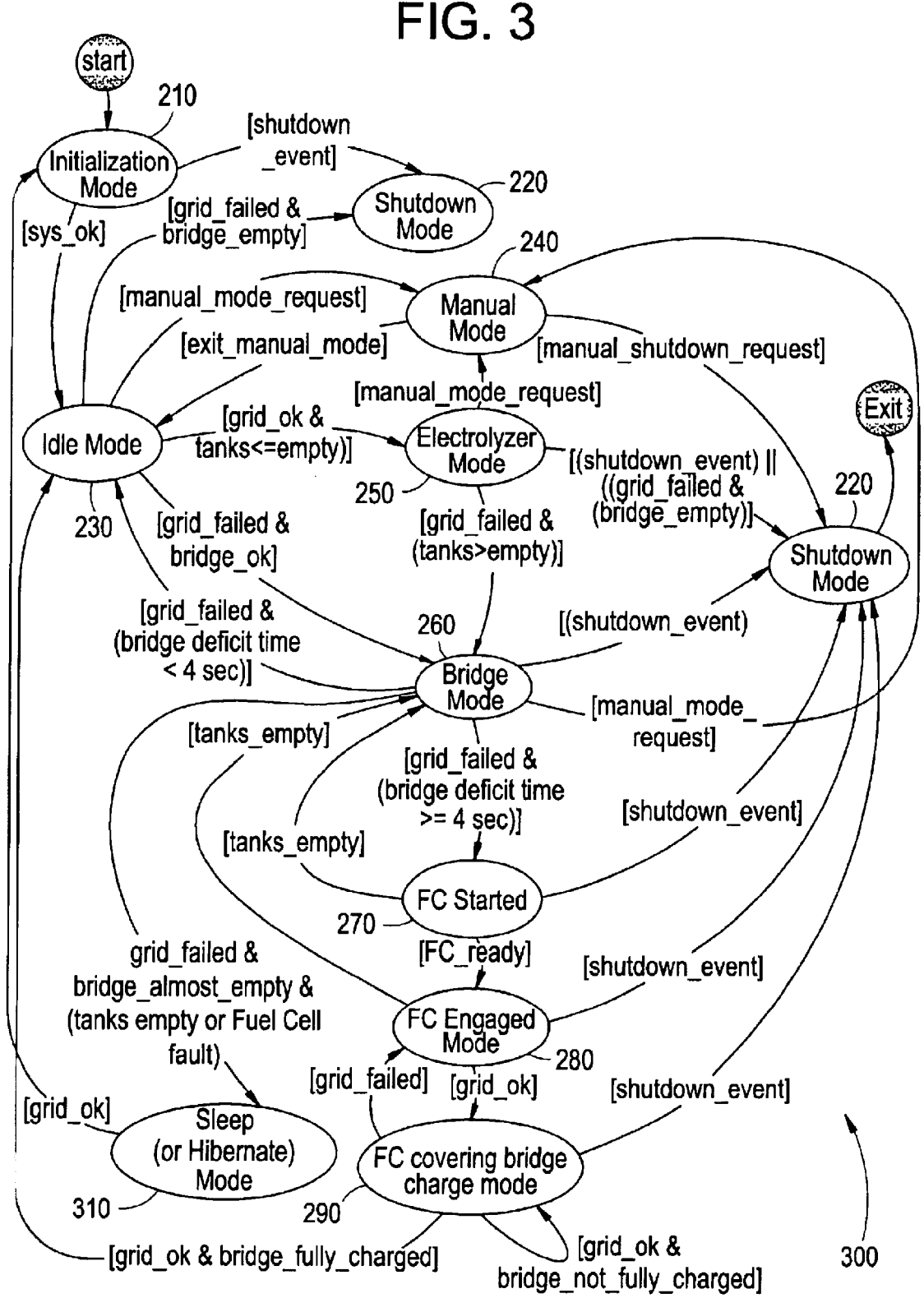
FIG. 3 is a state transition diagram depicting an alternative embodiment for a control methodology of a power system.

In an alternative embodiment. FIG. 3 is a state transition diagram depicting an exemplary method of control process 300 for the power system 10. The process 300 includes numerous modes and the criterion, requirements, events and the like to control changes of state among the various modes. The process 300 is similar to the process 200 disclosed above yet expanded to include additional modes. The sleep mode and its interfacing criterion provide additional functionality to the power system 10 to facilitate enhanced back up power sourcing in the event of primary power source failure and secondary power source 100 fault or depletion. The process 300, similar to the process 200, initiates with an initialization mode 210 monitoring and evaluation of various sensors ant states to ascertain the status of the power system 10. Such monitoring may include evaluation of the voltage of the grid power 32 on the primary bus 40, or a renewable primary source 32, such as wind speed or light level. As disclosed earlier, such a renewable power source 32 includes solar wind, tidal, geothermal resources, and the like, as well as combinations including at least one of the foregoing.

It will be appreciated that the process 300 includes numerous modes, states, and criteria similar to those disclosed in process 200 above. Therefore, additional discussion of the modes common to process 200 would be redundant and has been omitted. Reference should be made to the description provided herein.

Continuing with FIG. 3, the sleep mode 310 facilitates enhanced back up power sourcing in the event of primary power source 32 failure and secondary power source 100 fault or depletion. The purpose of the sleep mode 310 is to address the condition when there is no other power or power generation capability from the secondary power source 100 available. The sleep mode 310 ensures that minimal control, diagnostic, monitoring and reporting capabilities are kept operating with the power remaining. The sleep mode 310 may be entered with the process 300 transitioning from the bridge mode 260 if the primary power source 32 exhibits unsatisfactory status and the bridging apparatus 46 is substantially depleted and the hydrogen storage device 64 is empty, nor lower than a selected level or another operational fault exists which prevents operation of the secondary power source 100, and more particularly, the fuel cell 34. In an exemplary embodiment, the bridging power source 46 may be considered substantially depleted if the bridging apparatus is at a level, which can only support loads such as selected controls, diagnostics, and communication of status. The process 300 transitions from the sleep mode to the initialization mode 210 in the event that the primary power source 32 exhibits satisfactory status e.g., grid available once again.

The disclosed invention can be embodied in the form of computer or controller implemented processes and apparatuses for practicing those processes. The present invention can also be embodied in the form of computer program code containing instructions embodied in tangible media 70, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal 72, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power system, comprising:
   a primary power source in electrical communication with a bridging power source, wherein said bridging power source is in electrical communication with a bus;
   a secondary power source in electrical communication with said bus, wherein said secondary power source comprises an electrochemical system including a fuel cell;
   a controller electrically disposed between and in operable communication with said bus and said bridging power source, and electrically disposed between and in communication with said bus and said secondary power source;
   wherein said controller monitors said primary power source, initiates powering by said bridge power source when said primary power source exhibits selected characteristics, initiates said secondary power source when said bridging power source is depleted exceeding a first selected threshold, and initiates interruption of powering by said secondary power source when at least one of said primary power source does not exhibit said selected characteristics and said secondary power source is depleted.

2. The power system of claim 1, wherein said controller initiates interruption of said bridging power source is interrupted when said secondary power source is producing a desired power.

3. The power system of claim 1, wherein the controller initiates recharging of said bridging power source while said secondary power source operates.

4. The power system of claim 3, wherein said controller initiates powering with said bridging power source if said secondary power source is depleted beyond a second selected threshold.

5. The power system of claim 4, wherein said second selected threshold is responsive to a pressure of hydrogen remaining in a hydrogen storage device.

6. The power system of claim 4, wherein said selected loads include status and diagnostics.

7. The power system of claim 1, further including a converter electrically disposed between and in electrical communication with said primary power source and said bridging power source.

8. The power system of claim 1, wherein said first selected threshold comprises a duration of about 1 second to about 30 seconds.

9. The power system of claim 1, wherein said selected characteristics include at least one of, unavailable, inoperable, inadequate to provide power at expected parameters, and unfueled.

10. The power system of claim 1, wherein said controller further comprises a DC-DC power supply for converting an output voltage from at least one of said secondary power system and said bridging power source to a voltage corresponding to said bus.

11. The power system of claim 1, wherein said bridging power source comprises at least one of a capacitor and a battery.

12. A method for operating a power system, comprising:
    monitoring a primary power source;
    if said primary power source exhibits first selected characteristics;
    directing power from a bridging power source to a bus; and
    if said bridging power source is depleted to a first selected threshold, initiating a secondary power source and powering said bus with said secondary power source until at least one of said primary power source does not exhibit said first selected characteristics and said secondary power source exhibits second selected characteristics and
    wherein said secondary power source comprises a fuel cell.

13. The method of claim 12, further comprising recharging said bridging power source with power from said bus and operating said secondary power source at least until said bridging power source is recharged.

14. The method of claim 13, further comprising powering said bus with said bridging power source if said primary power source exhibits said first selected charcteristics and said secondary power source exhibits said second selected characteristics.

15. The method of claim 13, further comprising recharging said bridging power source with power from said primary power source.

16. The method of claim 14, further comprising providing power for selected loads if said secondary power source is depleted beyond a second selected threshold, wherein said selected loads include status and diagnostics.

17. The method of claim 16, wherein said second selected threshold is a pressure of hydrogen remaining in a hydrogen storage device.

18. The method of claim 12, further comprising at least one of applying and removing selected loads from said bus in response to status of said secondary power source.

19. The method of claim 12, wherein said directing further comprises converting a first voltage from said bridging power source to a second voltage and introducing said second voltage to said bus.

20. The method of claim 12, wherein said bridging power source comprises at least one of a capacitor and a battery.

21. The method of claim 12, wherein said first selected threshold is a duration of about 1 second to about 30 seconds.

22. The method of claim 12, wherein said first selected characteristics and said second selected characteristics are, individually, at least one of, unavailable, inoperable, inadequate to provide power at expected parameters, and unfueled.

23. The method of claim 12, further comprising monitoring at least one of a current and a voltage of said bridging power source and disconnecting said bridging power source if said at least one of said current and said voltage exceeds a third selected threshold.

24. The method of claim 23, wherein said third selected threshold is determined based upon a demand for power by said controller from said bridging power source.

25. A method for operating a power system, comprising:
   monitoring a primary power source; and
   if said primary power source is insufficient to meet a demand for power;
   powering a bus with a bridging power source; and
   if said bridging power source is depleted to a first selected threshold, initiating a secondary power source and powering with said secondary power source until at least one of said primary power source is sufficient to meet said demand and said secondary power source exhibits second selected characteristics;
   wherein said secondary power source comprises a fuel cell, and wherein at said first selected threshold is that said bridging power source comprises sufficient power to power said bus while said secondary power source initiates.

26. The method of claim 25, further comprising recharging said bridging power source with power from said bus and operating said secondary power source at least until said bridging power source is recharged.

27. A storage medium encoded with a machine readable computer program code, said code including instructions for causing a computer to implement a method for operating a power system, the method comprising:
   monitoring a primary power source;
   if said primary power source exhibits selected characteristics, directing power from a bridging power source to a bus; and
   if said bridging power source is depleted exceeding a first selected threshold, powering said bus with a secondary power source until at least one of said primary power source does not exhibit said selected characteristics and said secondary power source is depleted;
   wherein said secondary power source comprises a fuel cell.

28. A computer data signal, said computer data signal, comprising:
   instructions for causing a computer to implement a method for operating a power system, the method comprising:
   monitoring a primary power source;
   if said primary power source exhibits selected characteristics, directing power from a bridging power source to a bus; and
   if said bridging power source is depleted exceeding a first selected threshold, powering said bus with a secondary power source until at least one of said primary power source does not exhibit said selected characteristics and said secondary power source is depleted;
   wherein said secondary power source comprises a fuel cell.

* * * * *